United States Patent
Brown

(10) Patent No.: US 7,072,980 B2
(45) Date of Patent: Jul. 4, 2006

(54) METHOD AND SYSTEM FOR ROUTE TABLE MINIMIZATION

(75) Inventor: Michael Brown, University City, MO (US)

(73) Assignee: WilTel Communications Group, LLC, Las Vegas, NV (US)

(*) Notice: Subject to any disclaimer, the term of this patent is extended or adjusted under 35 U.S.C. 154(b) by 685 days.

(21) Appl. No.: 09/847,980

(22) Filed: May 2, 2001

(65) Prior Publication Data

US 2002/0165980 A1    Nov. 7, 2002

(51) Int. Cl.
*G06F 15/173*    (2006.01)

(52) U.S. Cl. .................. 709/242; 709/239; 709/240; 709/243; 709/244

(58) Field of Classification Search .............. 709/239, 709/240, 242
See application file for complete search history.

(56) References Cited

U.S. PATENT DOCUMENTS

| | | | |
|---|---|---|---|
| 5,506,838 A | | 4/1996 | Flanagan |
| 5,699,347 A | * | 12/1997 | Callon ........................ 370/238 |
| 5,999,536 A | * | 12/1999 | Kawafuji et al. ........... 370/401 |
| 6,009,097 A | * | 12/1999 | Han ........................ 370/395.52 |
| 6,078,963 A | * | 6/2000 | Civanlar et al. ............ 709/238 |
| 6,147,993 A | * | 11/2000 | Kloth et al. ................. 370/392 |
| 6,160,811 A | * | 12/2000 | Partridge et al. ........... 370/401 |
| 6,185,210 B1 | | 2/2001 | Troxel |
| 6,188,671 B1 | | 2/2001 | Chase et al. |
| 6,310,878 B1 | * | 10/2001 | Bodnar et al. .............. 370/396 |
| 6,363,056 B1 | | 3/2002 | Beigi et al. |
| 2002/0165980 A1 | * | 11/2002 | Brown ........................ 709/242 |

* cited by examiner

*Primary Examiner*—Tammara Peyton
*Assistant Examiner*—Alan S. Chen
(74) *Attorney, Agent, or Firm*—Fellers, Snider, Blankenship, Bailey & Tippens, P.C.

(57) ABSTRACT

A method and system that includes an IP flow monitor in conjunction with an IP route comparator and an IP route injector to minimize the size of routing tables that need to be stored in a router of an IP network. The IP flow monitor monitors information, such as destination information that identifies and differentiates one IP flow from another. The monitored information is passed to the IP route comparator, which determines if it has stored preferred path information for the IP flow identified by the monitored information. If so, the preferred path information is passed to the IP route injector, which in turn passes it to the router in the edge network. The router updates it routing table in accordance with the new routing information. Other described embodiments include an embodiment having a cache and embodiments in which one or both of the IP route comparator and the IP route injector are local to the network (instead of being local). Still another embodiment includes a local IP route comparator that accesses preferred path information stored on a remote database.

32 Claims, 8 Drawing Sheets

Without Destination Cache

With Destination Cache

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Version| IP header len (IPL) |Type of Service|    Total Length  |
+-+-+-+-+-+-+-+-+-+-+-+-+-+-+-+-+-+-+-+-+-+-+-+-+-+-+-+-+-+-+-+-+
|       Identification        |Flags|     Fragment Offset        |
+-+-+-+-+-+-+-+-+-+-+-+-+-+-+-+-+-+-+-+-+-+-+-+-+-+-+-+-+-+-+-+-+
| Time to Live |  Protocol    |      Header Checksum             |
+-+-+-+-+-+-+-+-+-+-+-+-+-+-+-+-+-+-+-+-+-+-+-+-+-+-+-+-+-+-+-+-+
|                       Source Address                           |
+-+-+-+-+-+-+-+-+-+-+-+-+-+-+-+-+-+-+-+-+-+-+-+-+-+-+-+-+-+-+-+-+
|                     Destination Address                        |
+-+-+-+-+-+-+-+-+-+-+-+-+-+-+-+-+-+-+-+-+-+-+-+-+-+-+-+-+-+-+-+-+
|                Options                    |    Padding          |
+-+-+-+-+-+-+-+-+-+-+-+-+-+-+-+-+-+-+-+-+-+-+-+-+-+-+-+-+-+-+-+-+
```

Example Internet Datagram Header

Fig. 6

METHOD AND SYSTEM FOR ROUTE TABLE MINIMIZATION

BACKGROUND

A. Technical Field

This application relates to a method of transferring data over one or more networks and, more specifically, to a method of minimizing the storage associated with routing tables in network devices connecting one or more networks.

B. Background of the Invention

The growth of the Internet, and the World Wide Web (Web) in particular, has led to enormous increases in the amount of traffic flowing over the group of connected networks that comprise the Internet and connected network systems. Access providers such as Internet Service Providers (ISPs) provide connections for businesses and individuals to connect to the Internet and access the Web. ISPs and other networks, such as intranets and extranets, must interconnect in order to allow their customers to reach points on the Internet serviced by other ISPs and/or other networks.

The Internet is currently implemented using the TCP and IP protocols, which allow information to be routed within the Internet. The Internet is, thus, an example of an IP network. Other examples of IP networks exist. In the future, the Internet may continue to use the TCP/IP protocols or may use some variation of the TCP/IP protocols.

In general, an IP network, such as the Internet, is composed of a number of IP networks. For example, an ISP may be a sub-network. Similarly, a network that connects ISPs may be an IP sub-network. An Intranet may be another example of an IP sub-network.

There are two types of IP sub-networks: edge sub-networks and transit networks. A transit sub-network is an IP sub-network that is not the destination for a specific IP flow. An edge IP sub-network is an IP sub-network that is a destination for a specific IP flow. An IP flow is a collection of IP packets, or groups of data, that all contain the same source and destination address. An IP flow may also be defined to a finer granularity to include, for example, the application and type of service in addition to the source and destination address. A particular IP sub-network can be both a transit sub-network and an edge sub-network for different IP flows. An edge IP sub-network is generally connected to another IP sub-network using an IP router, which is a device or, in some cases, software in a general purpose computer, that determines the next network point to which a data packet should be forwarded toward its destination.

Some IP networks route packets using a protocol know as BGP (Border Gateway Protocol). In the BGP protocol, each IP router contains a routing table that contains the "next hop" to a connection that a packet should take from the current router to reach its final destination.

In current implementations of the BGP routing method, routing tables include entries for a large number of destinations. The routing table in a router is updated with new and changed routing information using the BGP routing method. Because routing tables contain routes for a large number of destinations, the tables can become quite voluminous. As a network (such as the Internet) grows, the size of the routing tables becomes problematic. This problem is greater at customer locations using inexpensive routing equipment with a small amount of routing table storage.

What is needed is a system and method that reduces the amount of memory required by the routing tables in a router.

SUMMARY OF EMBODIMENTS OF THE INVENTION

The described embodiments of the present invention use an IP flow monitor in conjunction with an IP route comparator and an IP route injector to create minimum size routing table stored in router of an IP network.

The IP flow monitor monitors information, such as destination information that identifies and differentiates one IP flow from another. The monitored information is passed to the IP route comparator, which determines if the monitored flow should use the preferred path. If so, the preferred path information is passed to the IP route injector, which in turn passes it to the router in the edge sub-network. The router updates its routing table in accordance with the new routing information.

In the described embodiment, the IP flow monitor is coupled to at least one preferred path between the sub-network and another sub-network. If a first packet in an IP dataflow is sent over the default connection, it is monitored, which indirectly causes the routing table to be updated for the IP data flow to reflect the preferred routing information for that IP data flow. Subsequent packets of the IP data flow are then routed in accordance with the new routing information.

The described embodiments avoid the situation where all preferred path information must be stored by all routers. Only after a router has seen a particular IP flow is its routing table updated to include information relevant to that flow.

Other described embodiments include an embodiment having a cache and embodiments in which one or both of the IP route comparator and the IP route injector are local to the sub-network (instead of being remote). Still another embodiment includes a local IP route comparator that accesses preferred path information (prefix data) stored on a remote database.

Advantages of the invention will be set forth in part in the description which follows and in part will be apparent from the description or may be learned by practice of the invention. The objects and advantages of the invention will be realized and attained by means of the elements and combinations particularly pointed out in the appended claims and equivalents.

BRIEF DESCRIPTION OF THE DRAWINGS

FIG. 6 shows an example of an IP flow having multiple packets.

DETAILED DESCRIPTION OF THE EMBODIMENTS

Figure 1A:
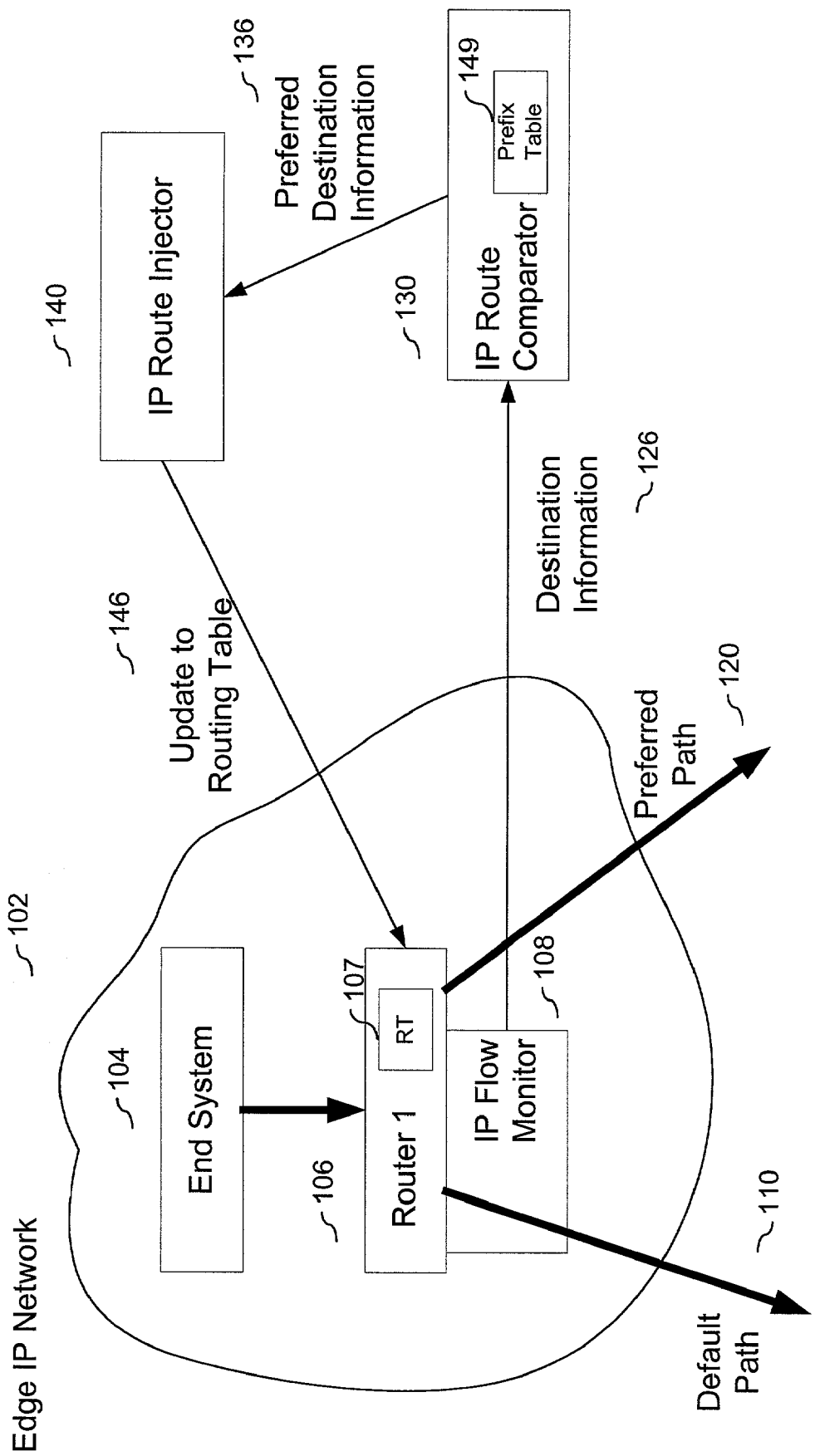
FIG. 1(a) is a block diagram showing a sub-network in accordance with a preferred embodiment of the present invention.

Reference will now be made in detail to several embodiments of the present invention, examples of which are illustrated in the accompanying drawings. Wherever practicable, the same reference numbers will be used throughout the drawings to refer to the same or like parts.

The described embodiments of the invention are implemented in an IP network composed of sub-networks and using the BGP routing protocol. The BGP routing protocol is described in, for example, the following Requests for Comments (RFCs), which are available from the Internet Engineering Taskforce (IETF): RFC 1771 (Describes BGP version 4); RFC 1654 (Describes the first BGP4 specification); RFC 1105, RFC 1163, and RFC 1267 (Describes versions of BGP prior to BGP4). All of the above-referenced RFCs are herein incorporated by reference. It will be understood that the present invention is capable of implementation in conjunction with appropriate future versions of the BGP protocol as well. It will also be understood that there currently exist, or may exist in the future, other protocols with which the present invention is capable of being implemented. A routing protocol that allows the next hop address to be specified in the routing update may be used. Thus, the present invention is not necessarily limited to the BGP routing protocol and IP network protocol. The functionality described herein in conjunction with the described embodiments can be implemented in either hardware (such as analog circuitry, digital circuitry, FPGAs, etc) or in software, using any appropriate programming language and/or operating system.

FIG. 1(*a*) is a block diagram showing a sub-network in accordance with a preferred embodiment of the present invention. An edge IP sub-network 102 includes an end system 104 (such as a PC, intranet, extranet, or ISP) and a router 106. As discussed above, router 106 connects the end system to other sub-networks in the larger IP network. Router 106 includes a routing table 107. An IP flow monitor 108 is incorporated in or coupled to router 106. IP flow monitor 108 can be implemented as hardware or software. For example, IP flow monitor 108 could be a router switch implemented at the packet level to check packets as they are sent out the default connection. As another example, monitor 108 could be a device outputting a Netflow Accounting Record, version 5. IP flow monitor 108 collects a destination IP address from packets of an IP flow that are routed past it. In other embodiments, IP flow monitor 108 additionally collects one or more of application name, application type, or service type from packets in an IP flow. The use of the collected information is discussed below.

Router 106 has between one and N network connections that are used to carry IP flows from the edge IP sub-network to the destination of the IP flow. In general, edge sub-networks communicate with a small subset of the IP address space. This assumption implies that a small number of IP routes are necessary for any edge IP sub-network. Router 106 preferably has at least one default path 110 predefined in the routing table 107 of router 106. Certain IP flows will have a preferred path, but in the described embodiment router 106 initially does not know about all preferred paths (i.e., does not have entries for all preferred paths in its routing table 107).

A preferred path may be, for example, a path associated with a tunnel or with an IP sub-net assigned to a specific path.

In general, IP flows can reach their destination via the default path(s) 110. A subset of the IP flows can reach their destination via the preferred path(s)120 for that IP flow. Router 106 routes packets to a connection on a default IP route 110 when no other IP route matches the destination IP address in an IP flow. Thus, if a router receives a packet that is destined for a destination that is not in the routing tables, the router will route the packet to a next router reachable by the default connection.

In certain embodiments, routing table 107 may initially contain a small initial number of preferred paths or may initially contain no preferred paths. In still other embodiments, routing table 107 is populated with a known set of destination prefixes by the IP route injector 140 when the IP routing tables are initialized. As shown in FIG. 1(*a*), information 126 collected by IP flow monitor 108 (such as, for example, destination information) is sent by IP flow monitor 108 to an IP route comparator 130. In the described embodiment, IP flow monitor 108 monitors packets sent on the default connection 110, but does not monitor packets sent by router 106 over its preferred connection(s) 120.

IP route comparator 130, which can be implemented as hardware or software, compares an IP prefix of the destination address to a table of prefixes 149. The prefix in a destination address indicates the sub-network (and thus any preferred path) to which a packet should be sent. IP route comparator 130 then sends preferred destination information 136 to an IP route injector 140. The IP route injector prepares routing table updates 146 in, for example, the BGP protocol (which is known to persons of ordinary skill in the art) incorporating the preferred destination information 136. The routing table updates 146 are sent to router 106, which updates its routing table 107 in accordance with the routing table updates 146.

Figure 1B:
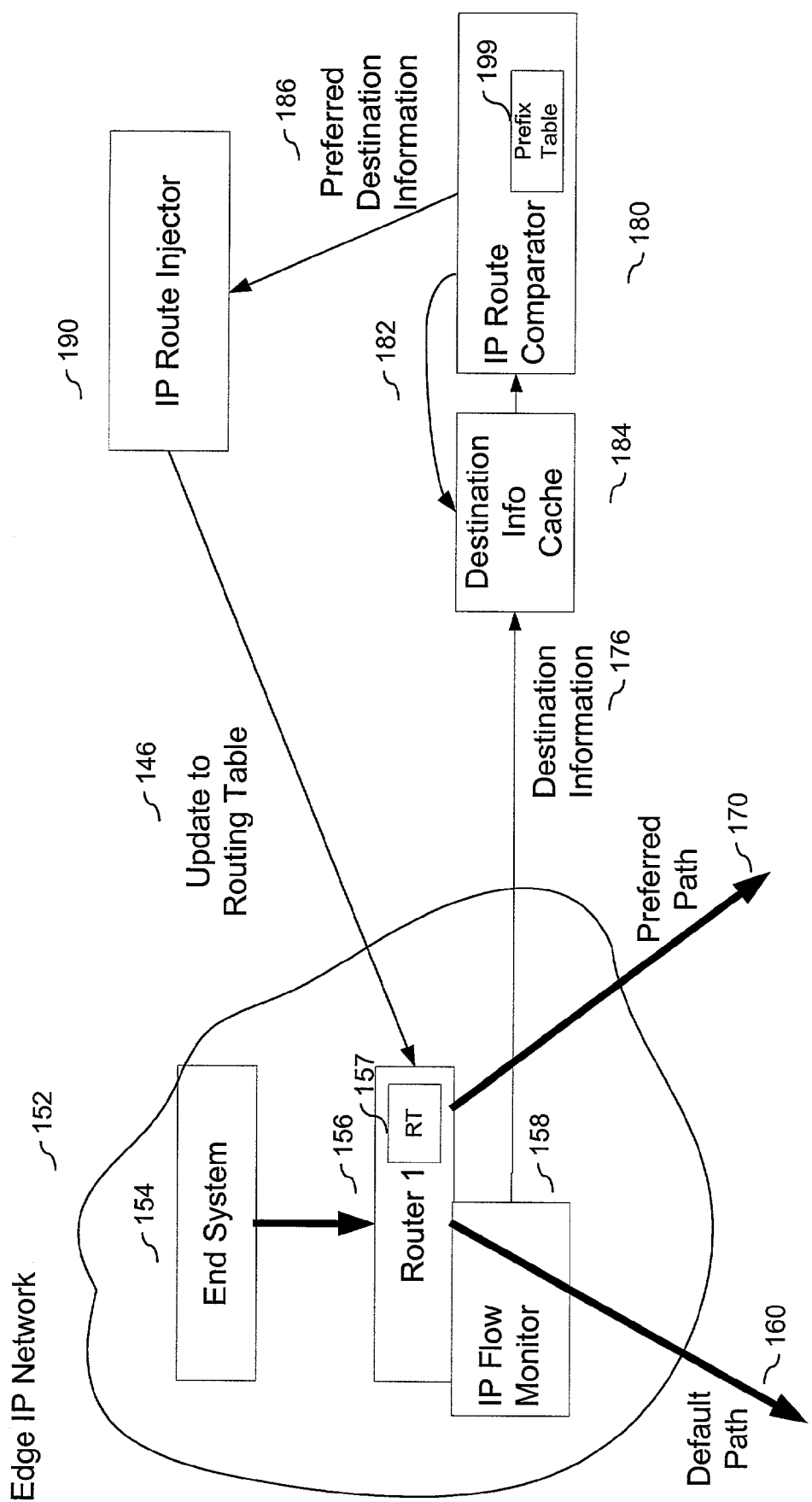
FIG. 1(b) is a block diagram showing a sub-network in accordance with a second preferred embodiment of the present invention that includes a destination information cache.
Figure 2A:
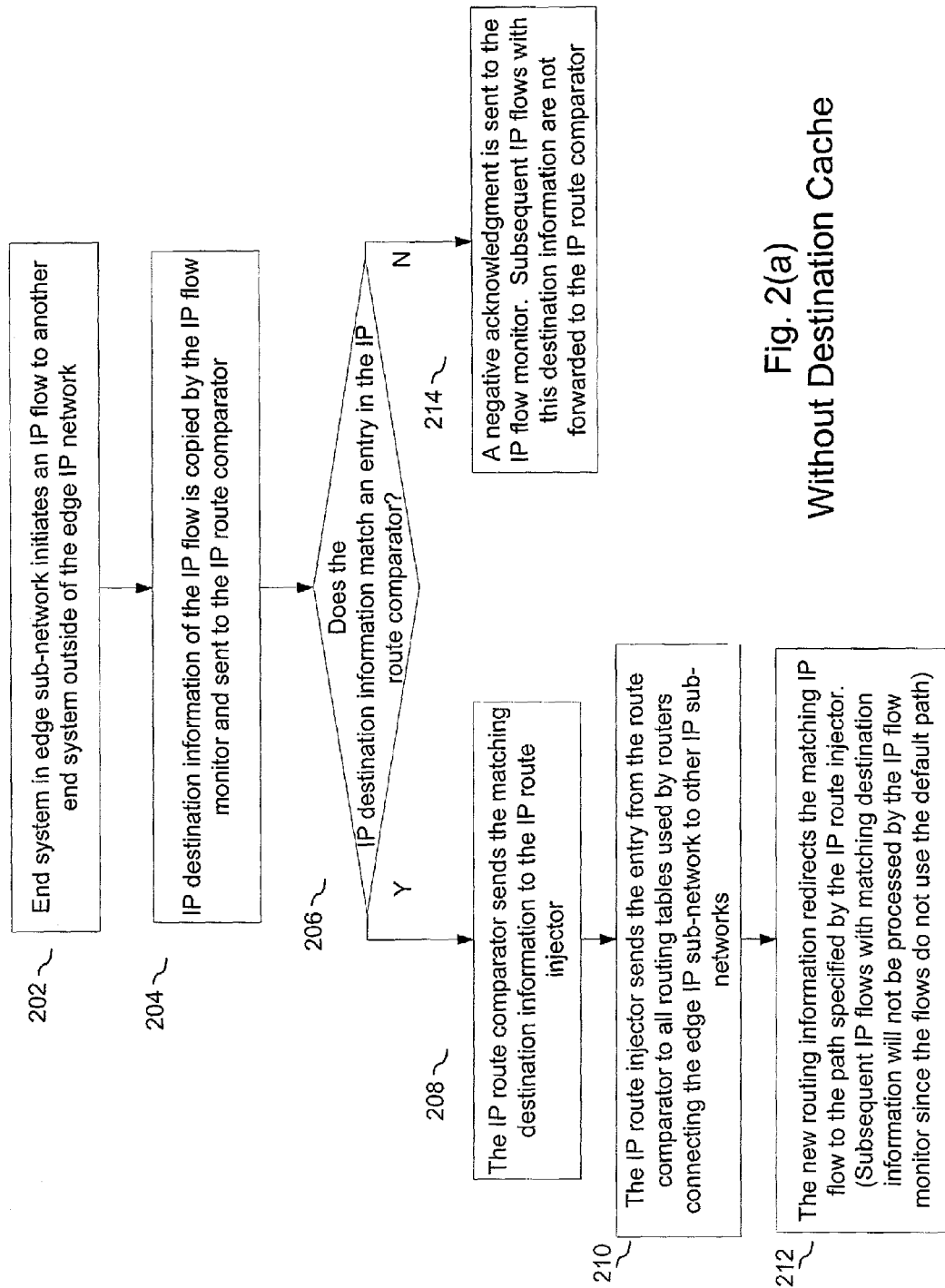
FIG. 2(a) is a flow chart of a method performed by the embodiment of FIG. 1.

FIG. 2(*a*) is a flow chart of a method performed by the embodiment of FIG. 1(*a*). In element 202, end system 104 initiates an IP flow to another end system outside of edge IP network 102. In this example, there is no routing information in routing table 107 for the packet and the packet is thus routed over default connection 110, which is monitored by IP flow monitor 108. In element 204, IP flow monitor 108 copies the destination information from the first packet in the IP flow and sends the destination information 126 from that packet to IP route comparator 130. The IP packet is transmitted on the default path because the IP route injector has not updated the route table (RT) 107 in the router (Router 1)106.

FIG. 6 shows an example of an IP version 4 packet. In the example, the IP format is written as a sequence of 32-bit "chunks." Fields include a source IP address 602 and a destination IP address 604. All packets in a particular IP flow will have the same destination address in field 604.

Continuing with FIG. 2(*a*), in element 206, IP route comparator 130 determines whether the destination information 126 matches any destination information (e.g., destination prefixes) in its prefix table 149.

If the destination information 126 is found in the prefix table of IP route comparator 130 then, in element 208, IP route comparator 130 sends the matching preferred destination information 136 to P route injector 140. In element 210, IP route injector 140 sends updated routing information based on the entry from the route comparator 130 to all routing tables used by routers connecting the edge IP network to other lip networks. Lastly, in element 212, router 106 redirects all subsequent packets in the IP flow (in this embodiment, other packets having the same destination packet) to the path specified by IP route injector 140. Thus, subsequent packets or IP flows with the same destination information as the packet causing the update will not be processed by IP flow monitor 108 since the IP flow will no longer use the default path. In the described embodiment, the first packet of an IP flow will be routed via the default path(s) 110 (so that it can be detected by IP flow monitor 108). Subsequent packets will be routed via the preferred path(s) 120. In some embodiments, if the IP destination information does not match an entry in IP route comparator 130, a negative acknowledgement is sent to IP flow monitor 108 so that subsequent items in the current IP flow will not be forwarded to the route comparator 130. This embodiment reduces the work required of IP route comparator 130 since it no longer needs to check whether it should send destination information to IP route injector 140.

The setup of routes in the prefix table preferably is accomplished using a BGP session as known to persons of ordinary skill in the art. Each router 106 is configured with a BGP peer session to IP route comparator 130. This peer session is used to send the local subnets to the comparators, which then installs or forwards the routes to the prefix table/database. Route comparator 130 includes functionality to update routes in the prefix table.

Figure 3:
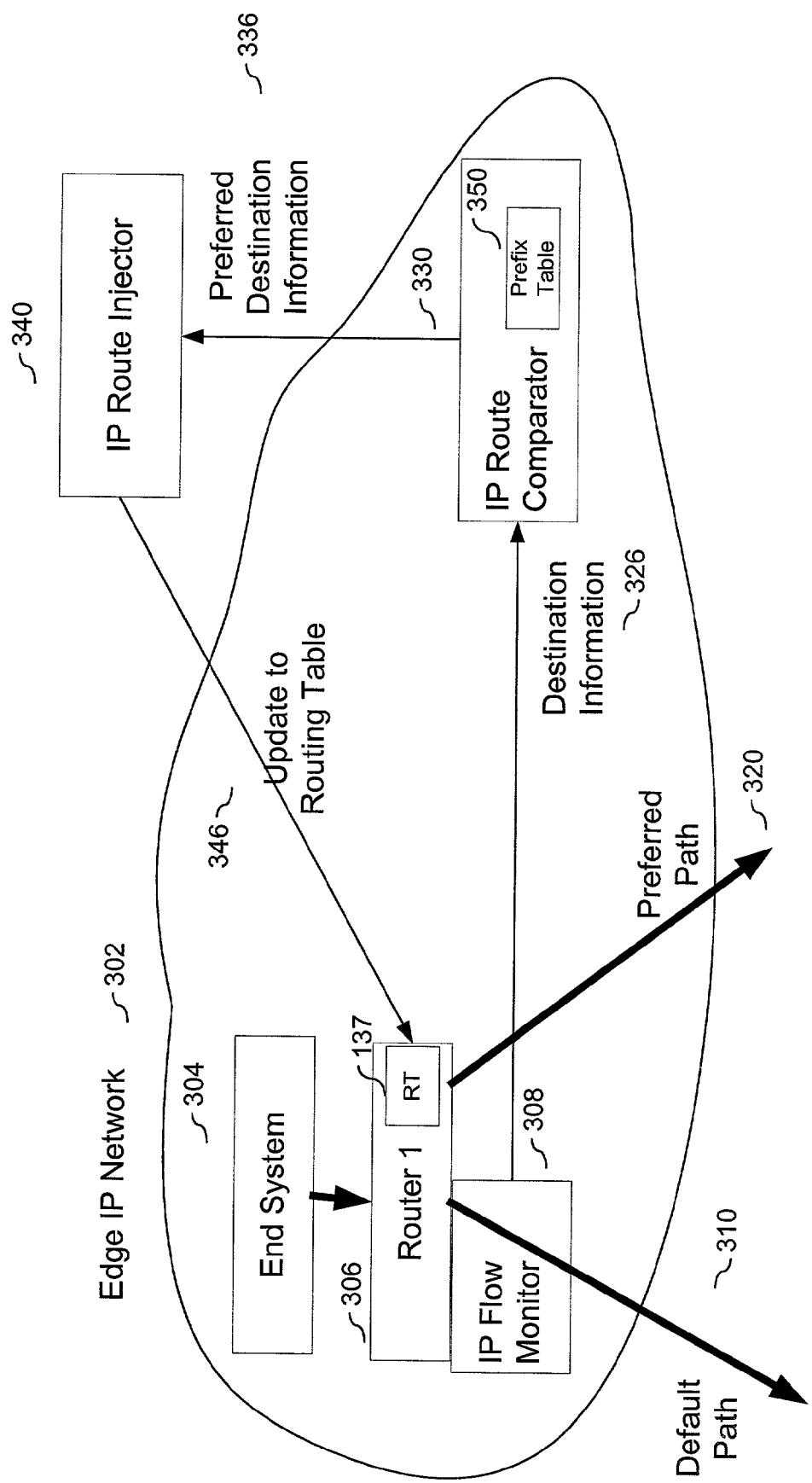
FIG. 3 is a block diagram showing a sub-network in accordance with a third preferred embodiment of the present invention.

FIG. 3 illustrates the sequence of events when a destination prefix is withdrawn from the prefix table. The withdrawal of routes is triggered by either withdrawal of prefixes using the BGP session from the route comparator or loss of this BGP session. The purpose of this logic is to remove the destination prefix from any caches and routing tables. A database (such as 548 of FIG. 5) tracks which route injectors have used each prefix. When a prefix is withdrawn, every route injector that uses the prefix is notified to remove the route from their corresponding routing table.

FIG. 1(b) is a block diagram showing a network in accordance with a second preferred embodiment of the present invention that includes a destination information cache 184. The system of FIG. 1(b) is similar to that of FIG. 1(a) except that it contains destination information cache 184. In the described embodiment, IP flow monitor 158 always sends destination information 176 to destination information cache 184. Cache 184 checks the received destination information 126 against the destination information already stored in the cache.

Figure 2B:
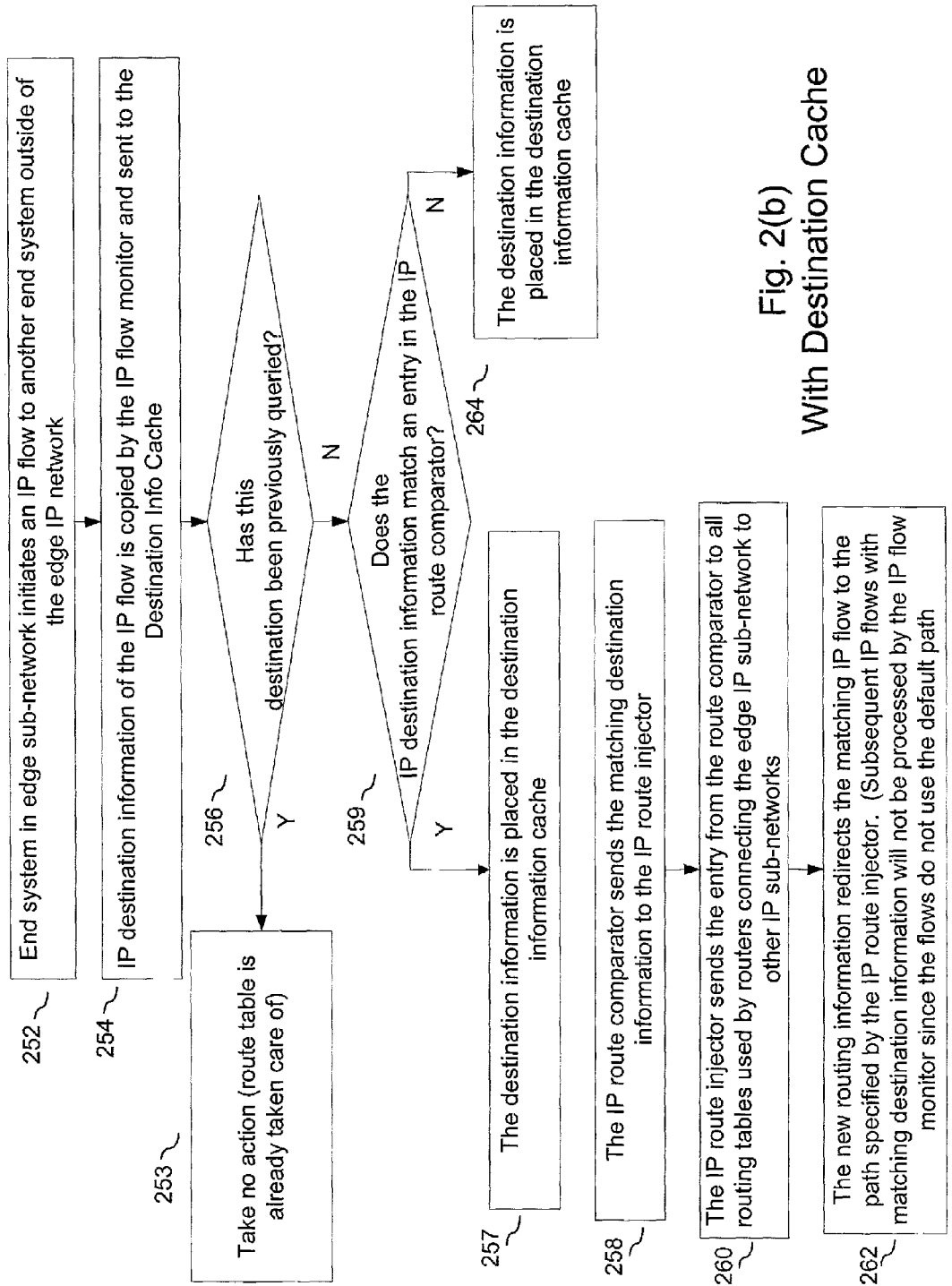
FIG. 2(b) is a flow chart of a method performed by the embodiment of FIG. 2.

As shown in elements 256 and 253 of FIG. 2(b), if a destination has previously been queried (as shown by its presence in the cache 184), no action is taken since it is assumed that the route information is already updated in router 106.

FIG. 1(b) also shows how information is placed in cache 184. In the described embodiment, IP route comparator 180 always sends the destination information 176 back to cache 184, whether it is in the prefix table 199 of IP route comparator 180 or not (see elements 257 and 264 of FIG. 2(b)). In the described embodiment, no acknowledgment is sent back to IP flow monitor 158 since the cache 184 performs the function of filtering out destination information that has already been considered by IP route comparator 180. The communication path 182 is used to remove entries from the destination cache 184 to maintain consistency between the cache 184 and the prefix table 199. Cache entries are removed from the destination cache when a prefix is added to the prefix table.

FIG. 3 is a block diagram showing a network in accordance with a third preferred embodiment of the present invention. In the embodiments of both FIG. 1(a) and FIG. 1(b), the IP flow monitor is coupled to the router and is considered to be within respective edge IP networks 102 and 152. In contrast, FIG. 3 shows that IP route comparator 330 can also be local to network 302.

Figure 4:
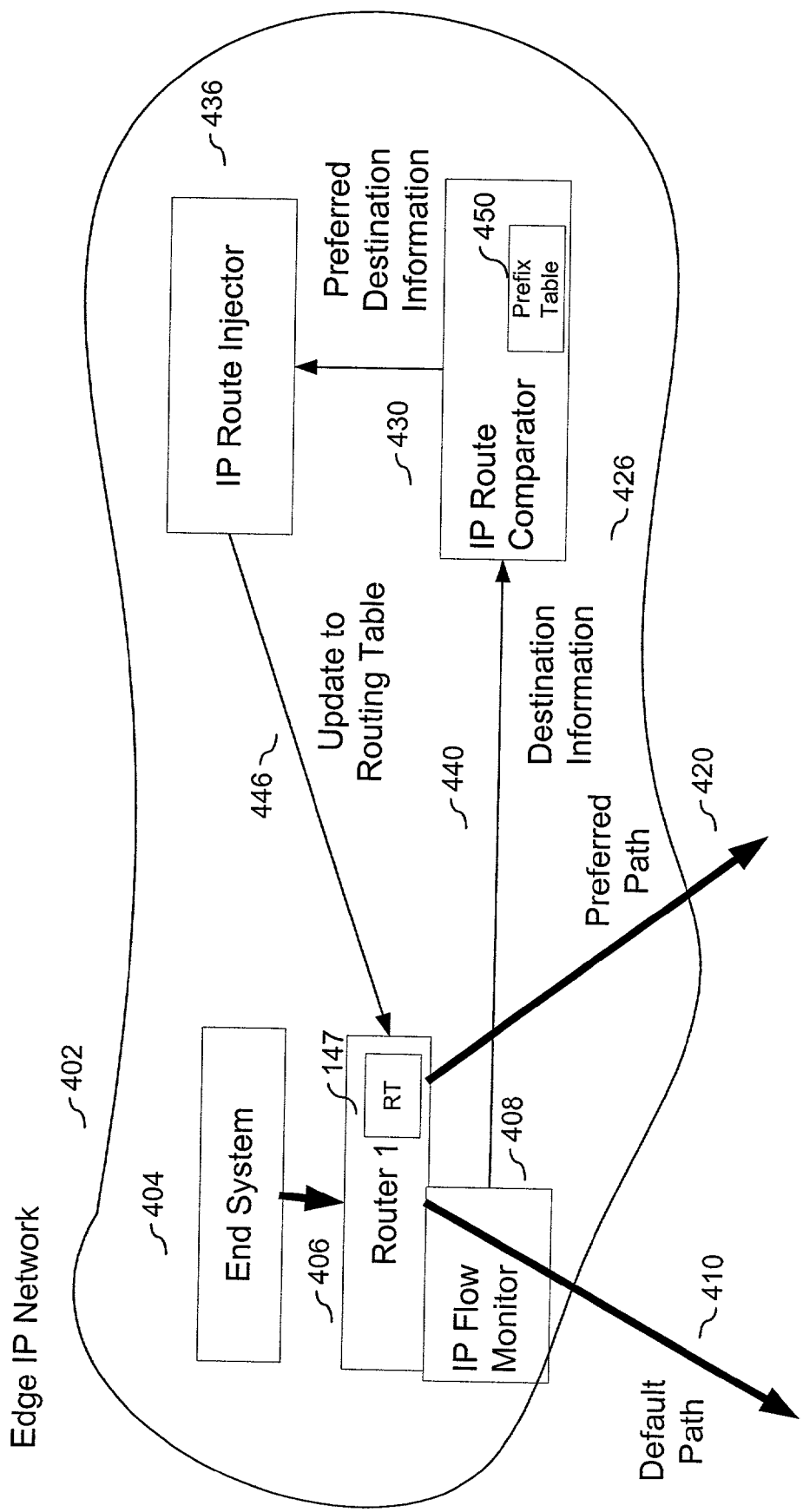
FIG. 4 is a block diagram showing a sub-network in accordance with a fourth preferred embodiment of the present invention.

FIG. 4 is a block diagram showing a network in accordance with a fourth preferred embodiment of the present invention. In FIG. 4, the IP route injector 436 and IP route comparator 430 are both local to the IP network 402. Configuring both the route comparator and route injector as local functions minimizes network latencies and improves reliability. In various embodiments, the IP route comparator and the IP route injector may be local, remote, or a mixture of local and remote. In addition, the IP route comparator and the IP route injector may be combined in certain embodiments.

Figure 5:
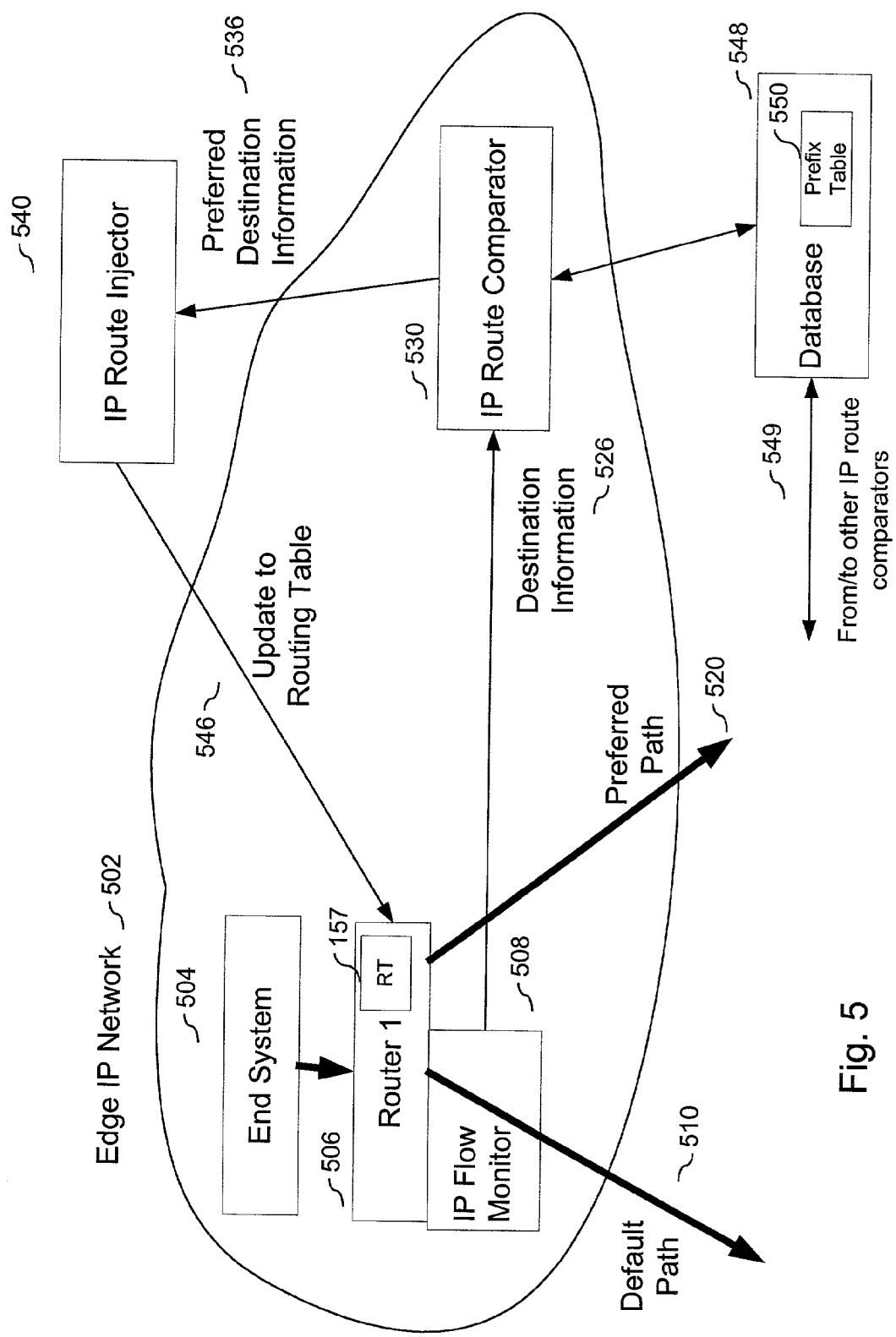
FIG. 5 is a block diagram showing a sub-network in accordance with a fifth preferred embodiment of the present invention.

FIG. 5 is a block diagram showing a network in accordance with a fifth preferred embodiment of the present invention. (In this embodiment, IP route injector 540 is shown as being remote, although in certain embodiments, it may also be local to network 502.) In FIG. 5, each IP route comparator 530 in a network queries one or more remote databases 548 to access a prefix table(s) 550. The fact that more than one IP route comparator is capable of accessing database 548 is indicated by connection 549 in the figure. Whenever each IP route comparator 530 needs to compare received destination information 526, it queries database 548 to see if a match exists. Alternately, one or more IP route comparators 530 may cache the results of their database queries locally in order to reduce the number of database accesses.

FIG. 6 shows an example of an IP packet. In the example, the IP format is written as a sequence of 32-bit "chunks." Fields include a source IP address 602 and a destination IP address 604. As discussed above, all packets in a particular IP flow will have the same destination address in field 604. IP flow monitor 108, in certain embodiments, also monitors information in addition to the destination address to determine when a packet belongs to a particular IP flow. This information can include, without limitation, type of service 606. For example, a current version of BGP (BGP4) includes the following types of service:

Bits 0–2: Precedence.
Bit 3: 0=Normal Delay, 1=Low Delay.
Bits 4: 0=Normal Throughput, 1=High Throughput.
Bits 5: 0=Normal Reliability, 1=High Reliability.
Bit 6–7: Reserved for Future Use.

Any of these type of service fields can be monitored by IP flow monitor 108 and included in the format of prefix table 149 of FIG. 1(a) or any similar prefix table.

If application type and destination address are monitored, for example, an IP flow might be defined as all file transfers sent to destination X. As another example, an IP flow might be considered all requests from a server at destination Y. Thus, an IP flow can be defined differently depending on the type of identifying data being monitored for the IP flow.

Other information that might be monitored and included in the prefix table format include protocol type, source and/or destination port number, source IP address, diffserv bits (i.e., bits associated with the Differentiated Services (diffserv) protocol. The diffserv protocol provides a framework that enables deployment of scalable service discrimination over the Internet), etc. In general, any appropriate type of information discernible from a monitored packet and useful to determining a preferred path for the packet in the subject network may be used.

Thus, in summary, the present invention avoids having to store all preferred path information in all routers. The output of each router is monitored and preferred path information is updated from an IP route injector as needed. Thus, the routing tables of routers employing the present invention are usually smaller than conventional routing tables.

Accordingly, the present invention is intended to embrace all such alternatives, modifications and variations as fall within the spirit and scope of the appended claims and equivalents.

What is claimed is:

1. A method of minimizing routing table size, comprising:
    monitoring a packet in a flow sent by a router connected to an edge IP network, to determine identifying information;
    determining, in accordance with the monitored identifying information, whether any preferred routing information exists for the flow; and
    if preferred routing information exists, sending updated routing tables incorporating the updated routing information to the router connected to the edge IP network and to all routers connecting the edge IP network to other IP networks.

2. The method of claim 1, wherein the monitoring is performed by an IP flow monitor coupled to the router.

3. The method of claim 1, wherein the monitoring is performed by an IP flow monitor incorporated into the router.

4. The method of claim 1, wherein the monitoring includes monitoring a destination address of the packet.

5. The method of claim 1, wherein the monitoring includes monitoring an application type of the packet.

6. The method of claim 1, wherein the monitoring includes monitoring a type of service field of the packet.

7. The method of claim 1, wherein the monitoring includes monitoring a protocol type of the packet.

8. The method of claim 1, wherein the monitoring includes monitoring a port number of the packet.

9. The method of claim 1, wherein the monitoring includes monitoring a source IP address of the packet.

10. The method of claim 1, wherein the monitoring includes monitoring diffserv bits of the packet.

11. The method of claim 1, wherein the determining whether any preferred routing information exists for the flow includes looking the identifying information up in a table of preferred path information.

12. The method of claim 1, wherein the determining whether any preferred routing information exists for the flow includes looking the identifying information up in a table of preferred path information stored on a local IP route comparator.

13. The method of claim 1, wherein the determining whether any preferred routing information exists for the flow includes looking the identifying information up in a table of preferred path information stored on a remote IP route comparator.

14. The method of claim 1, wherein the determining whether any preferred routing information exists for the flow includes looking the identifying information up in a table of preferred path information stored on a remote database.

15. The method of claim 1, wherein sending updated routing tables to the router incorporating the updated routing information includes sending the updated routing information to a local IP route injector.

16. The method of claim 1, wherein sending updated routing tables to the router incorporating the updated routing information includes sending the updated routing information to a remote IP route injector.

17. The method of claim 1, wherein sending updated routing tables to the router incorporating the updated routing information includes sending, by an IP route injector, a BGP update message to the router in accordance with the updated routing information.

18. The method of claim 1, wherein the router uses a BGP routing method.

19. The method of claim 1, wherein the packet is sent by an end system.

20. The method of claim 1, wherein the packet is received by an end system.

21. The method of claim 1, wherein the updated routing information causes the next packet to be sent over a preferred connection in reaction to the updated routing information.

22. The method of claim 1, further including updating a routing table of the router in accordance with the updated routing information.

23. The method of claim 1, further including routing a second packet of the flow in accordance with the updated routing information so that the second packet of the flow is routed over a preferred connection.

24. The method of claim 1, wherein the preferred routing information refers to a preferred connection from the router for the flow to which the packet belongs.

25. The method of claim 1, further including caching the identifying information to avoid having to determine whether other packets in the flow have updated routes.

26. The method of claim 1, further including receiving the identifying information by a cache and determining whether the identifying information has been monitored before.

27. The method of claim 1, further including sending from an IP route comparator to a cache, the fact that the identifying information has been considered by the IP route comparator and does not need to be considered again.

28. The method of claim 1, wherein a preferred path is a subnet assigned to a specific path.

29. A system that minimizes routing table size, comprising:
    apparatus configured to monitor a packet in a flow sent by a router, connected to an edge IP network, to determine identifying information;
    apparatus configured to determine, in accordance with the monitored identifying information, whether any preferred routing information exists for the flow; and
    apparatus configured to, if preferred routing information exists, send updated routing tables incorporating the updated routing information to the router connected to the edge IP network and to all routers connecting the edge IP network to other IP networks.

30. An IP flow monitor that minimizes routing table size, comprising:
    apparatus configured to monitor a first packet in a flow sent by a router connected to an edge IP network, to determine dataflow identifying information and to send that dataflow identifying information to each entity communicating with the edge IP network that contains preferred routing information for the identified dataflow; and an apparatus interacting with each entity communicating with the edge IP network and configured to receive updated routing tables incorporating updated preferred routing information for the dataflow.

31. A route comparator interacting with a router connected to an edge IP network, comprising:
apparatus configured to receive a first packet in a dataflow, the first packet containing identifying information;
apparatus configured to determine, in accordance with the identifying information, whether any preferred routing information exists for the flow; and
apparatus configured to, if preferred routing information exists, direct the sending of updated routing tables incorporating the updated routing information to the router connected to the edge IP network and to all routers connecting the edge IP network to other IP networks.

32. The route comparator of claim 31, further comprising:
a destination info cache to determine whether the identifying information in the first packet has already been seen by the route comparator.

* * * * *